April 5, 1938. H. WOHLDORF 2,113,338
VEHICULAR COUPLING
Filed June 1, 1936
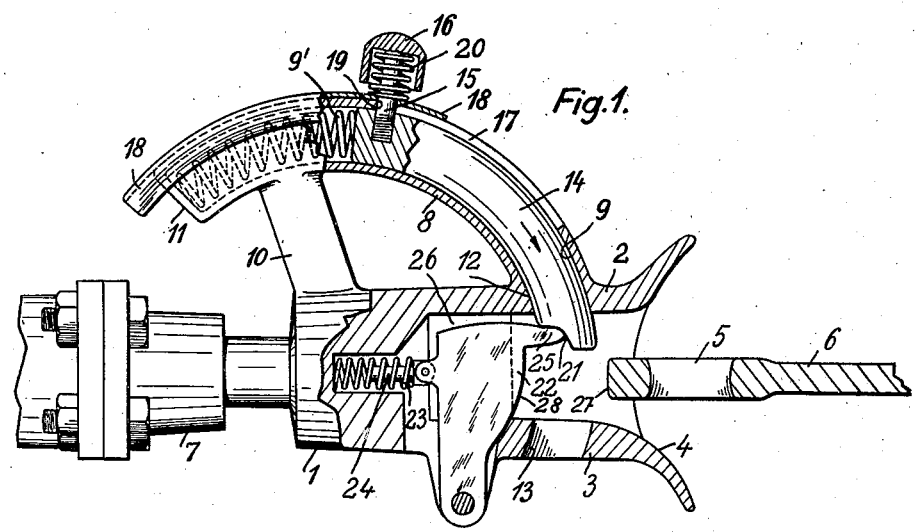
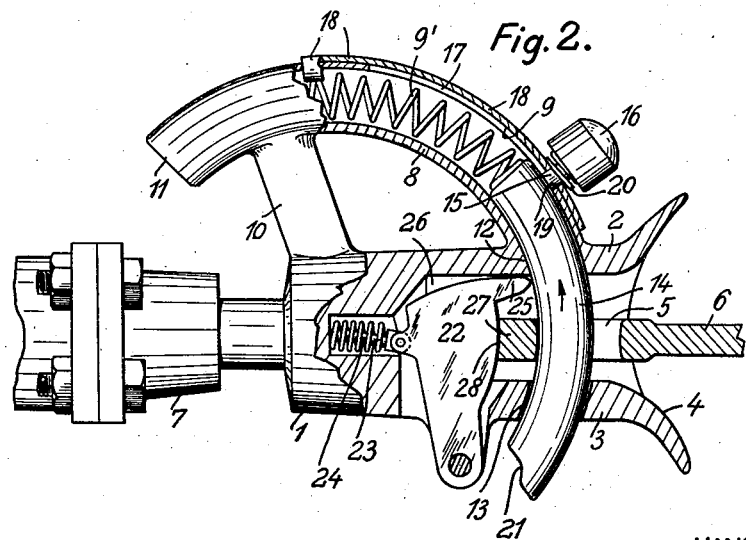
HANS WOHLDORF
Inventor
Attorney Patented Apr. 5, 1938

2,113,338

UNITED STATES PATENT OFFICE 2,113,338

VEHICULAR COUPLING

Hans Wohldorf, Neumuenster, Germany

Application June 1, 1936, Serial No. 82,996
In Germany February 15, 1936

1 Claim. (Cl. 280—33.15)

The present invention relates to automatic coupling devices for vehicles, and is particularly applicable for use in coupling trailers to motor vehicles.

Couplings have already been proposed for motor vehicles, in which the coupling includes a forked guide member for the draw bar, the eye portion of which is releasably secured in the guide member by a bolt. Coupling yokes have also been proposed in which a coupling hook could be locked in the coupled position. Such prior arrangements of which I am aware have the disadvantage that they either are not sufficiently reliable in practice, or that they permit only a slight deviation of the draw bar so that interruptions in operation readily occur when the coupled vehicles are traversing sharp curves, or that they do not permit automatic coupling so that accidents to the operators are frequently caused, while in particular they have too great a structural height so that they could not be employed with low chassis.

The object of the present invention is to provide a modified form of automatic coupling device which in practice obviates the disadvantages of the prior arrangements above referred to.

According to the present invention provision is made of an automatic coupling device with a forked coupling member wherein the draw bar is secured in the coupling member by means of a coupling pin which has the form of a section of an annulus.

In a practical embodiment of the invention, the coupling pin slides in a guide in the form of a tubular arc of corresponding radius of curvature which is arranged above the forked coupling member. Preferably the coupling pin is subjected to the pressure of a spring, for example a helical spring, which bears at one end against the upper part of the coupling pin and at the other end against the opposite end of the tubular arc.

Provided in the coupling member is preferably a locking device, for instance a spring urged lever or the like provided with a projection or lug which in the opened position can engage in a corresponding recess in the lower part of the coupling pin, the lever being so shaped that in the coupling operation it is engaged by the coupling eye portion of the trailer draw bar and moved out of the recess in the coupling pin so that under the action of the spring the coupling pin is urged automatically into the coupling position.

One embodiment is shown by way of example in the drawing in which

Fig. 1 shows the coupling device according to the present invention in vertical longitudinal section in the opened position ready for coupling, and Fig. 2 shows the same coupling device in the coupled position.

As seen from the drawing, the coupling device according to the present invention consists of a forked head 1 with an upper fork 2 and a lower fork 3 flared to form a guide 4 of funnel or similar shape, to enable a ready introduction of the coupling eye 5 of the draw bar 6 of the trailer. The forked head 1 is rigidly secured to the motor vehicle in known manner by means of a connection 7.

On the upper part of the forked head 1 an arcuate tube or sleeve 8 with a circular bore 9 extends from the upper fork 2. The sleeve is connected at its upper free end to the head 1 by means of a strut 10, the upper end being closed by a cap 11 or the like. At its lower end the sleeve is connected to the upper fork 2 so that the bore 9 in the sleeve merges into a bore 12 in the upper fork 2, this bore being continued as a corresponding bore 13 in the lower fork 3.

Longitudinally slidable in the bore 9 of the guide sleeve 8 is a coupling pin 14 which also has the form of a section of an annulus, i. e. a segment of the radius of curvature of the bore 9, and is of circular cross section. At its upper end, the coupling pin 14 is connected with a pin 15 which terminates in a handle or knob 16 and can slide in a longitudinal slot 17 in the sleeve 8. The longitudinal slot 17 is covered by a cover plate 18 which has an aperture 19 to permit the passage of the pin 15 so that by means of the latter the cover plate 18 participates in the displacement of the coupling pin 14. Moreover, the cover plate 18 is urged against the curved outer wall of the sleeve 8 by means of a helical spring 20.

Disposed between the rear part of the coupling pin 14 and the base 11 of the sleeve 8 is a helical spring 9' which tends to urge the coupling pin 14 downwardly into the coupled position.

Provided in the lower part of the coupling pin 14 is a recess 21 in which can engage the projection or lug 25 of a locking lever 22 in the ready-for-coupling position, the lever being pivotal about a pin 24 and subjected to the thrust of a spring 23. The locking lever 22 can move in a recess 26 in the head 1.

In the idle position, the lug 25 of the locking lever 22 engages in the recess 21 in the coupling pin 14 and holds the coupling pin in the un-coupled position as shown in Fig. 1.

If now the draw bar 6 of the trailer is introduced with its coupling eye 5 into the funnel shaped guide 4 of the head, then it slides between the two forks 2, 3 until its leading portion 27 engages the locking lever 22 at the point 28, displaces the locking lever 22 (to the left in the embodiment shown in the drawing) against the pressure of the spring 23, so that the lug 25 is withdrawn from the recess 21 and thus from the profile of the coupling pin 14, which under the pressure of the spring 9' is urged through the opening 12 in the fork 2, through the coupling eye 5 in the draw bar 6 and through the bore 13 in the lower fork 3 to secure the draw bar 6 in the coupled position.

It has been found that this construction satisfies all practical requirements. If desired, the coupling pin 14 can be held by a suitable locking device, for example a pin, a yoke which embraces the pin 15 or the knob 16 and which may be spring urged, or by other suitable means.

Also, a locking can be effected by the lever 22 by the lug 25 engaging in another recess, not shown in the drawing, in the coupling pin 14, so that the coupling pin is held in the coupling position. Provision must then be made for retracting the catch 22 by a suitable device for uncoupling.

For uncoupling, the coupling pin 14 is moved upwardly against the action of the spring 9' by means of the knob 16, until the lug 25 engages in the recess 21 and holds the coupling pin 14 in the uncoupled position.

The invention is not limited to the embodiments shown and described and the scope of the present invention includes all arrangements in which the coupling is effected by a coupling pin which has the form of a section of an annulus.

I claim:—

A coupling head for engaging a draw-bar with an eye substantially at the free end thereof, said head having an open socket for receiving the free end of said draw bar, a slidably mounted, substantially arcuate coupling pin resiliently urged across said mouth to an eye-engaging position, and a pivoted latch lever resiliently urged to one position to engage said pin whereby to prevent the same from sliding across said mouth, and movable to another position to release said pin, said lever having a pin-engaging portion, and a bar-engaging portion, the latter portion being substantially set back from the former whereby to engage the said bar end only when said eye is in a pin-receiving position, a substantially arcuate guard sleeve integral with said head for enclosing said pin, said pin being slidable in said sleeve, said sleeve having a slot along the periphery thereof, a handle attached to said pin and extending through said slot, and a curved guard strip attached to said handle whereby to cover the said slot when said pin is in guard engaging position.

HANS WOHLDORF.